United States Patent [19]

Van Dijk et al.

[11] 3,787,628

[45] Jan. 22, 1974

[54] COMMUNICATION SYSTEM FOR THE TRANSMISSION OF INFORMATION BETWEEN TWO TERMINAL STATIONS BY PULSE CODE MODULATION

[75] Inventors: Leonardus Petrus Jozef Van Dijk; Jan Verhagen, both of Hilversum, Netherlands; Georg Feütsch, Dietikon, Switzerland; Geerlof Jan Korevaar, Hilversum, Netherlands

[73] Assignee: U.S. Philips Corporation, New York, N.Y.

[22] Filed: Jan. 6, 1972

[21] Appl. No.: 215,818

[30] Foreign Application Priority Data

Jan. 8, 1971 Netherlands ....................... 7100210

[52] U.S. Cl. ............................................ 179/15 BF

[51] Int. Cl. ............................................ H04j 3/14

[58] Field of Search ..... 179/15 BF, 175 R, 175.2 R, 179/175.2 C; 325/31, 41, 67

[56] References Cited

UNITED STATES PATENTS

| | | | |
|---|---|---|---|
| 3,622,877 | 11/1971 | MacDavid | 325/67 |
| 3,691,306 | 9/1972 | Mold | 179/15 BF |
| 3,154,738 | 10/1964 | Greene | 179/15 BF |
| 3,057,972 | 10/1962 | Mann | 179/175 |
| 3,496,536 | 2/1970 | Wheeler | 325/67 |
| 3,683,115 | 8/1972 | Schellenberg | 179/15 BF |

*Primary Examiner*—Kathleen H. Claffy
*Assistant Examiner*—David L. Stewart
*Attorney, Agent, or Firm*—Frank R. Trifari

[57] ABSTRACT

A time division multiplex PCM transmission system in which the coder and decoder present in one and the same terminal station are supervised on conversion accuracy with the interposition of a test signal generator connected to at least one of the incoming channels, a digital store arranged between coder output and decoder input, and a supervision device connected to at least one of the outgoing channels. The digital store is provided with a separate control unit controlling writing and reading of amplitude samples of the test signal converted into a coded form and selecting the consecutive writing and reading intervals in such a manner that they cannot overlap one another in spite of their mutually varying time relation.

5 Claims, 3 Drawing Figures

COMMUNICATION SYSTEM FOR THE TRANSMISSION OF INFORMATION BETWEEN TWO TERMINAL STATIONS BY PULSE CODE MODULATION

The invention relates to a communication system for the transmission of information between two terminal stations by pulse code modulation, which stations each include an encoder and a decoder coupled to *n* incoming channels and *n* outgoing channels through a time division multiplex device and a time division demultiplex device, respectively. Each device operates at its own clock frequency, and each clock frequency is decisive of the sampling frequency per incoming and outgoing channel, respectively.

Communication systems of the type mentioned above are well-known, and are used on a large scale in, for example, a telephony system. In view of the stringent quality requirements imposed on such systems, it is common practice to check at least the transmission path and the intermediate and terminal repeaters incorporated therein, as to their satisfactory operation. This can be simply realized by supervision of the transmitted synchronizing signal.

Since the encoders and decoders forming part of the system are not supervised when performing the above-mentioned test, while the inaccuracies introduced upon faulty operation of these devices directly affect the quality, the present trend is to check these encoders and decoders on their accurate operation with the aid of a separate test signal. This is applied to the encoder of a terminal station, where it is encoded and subsequently applied through a transmission channel to the decoder in the other terminal station. Here the decoded signal is applied to a supervision device for comparison with a reference.

Apart from the fact that this method is accompanied by the loss of an information channel, this method also has the serious drawback that it is by no means obvious, in case of alarm, in which of the two terminal stations the error occurs which has caused the alarm. Moreover, this known method is liable to give false alarms, since the error measured, instead of being caused by faulty operation of the coder and/or decoder, may be the result of a malfunctioning of the transmission path.

It is an object of the present invention to provide a system with improved means for supervising the coders and decoders, so that the error is localized more precisely, while the loss of an information channel can be prevented, if desired, and the occurrence of false alarms is obviated to a large extent.

According to the invention, such a system is formed in that at least one of the *n* incoming channels of a terminal station is connected to a test signal generator, and at least one of the *n* outgoing channels of the same terminal station is connected to a supervision device. While in this station the output of the encoder is also coupled to the input of the decoder through a digital store, which is controlled by a control unit by which, on the one hand, an amplitude sample of the analog test signal converted into encoded form by the coder, is written in the store at a frequency which is submultiple of the sampling frequency of the test signal, while on the other hand, the written value is read from the store, and applied to the decoder at a frequency which is substantially equal to said submultiple, and which is in synchronism with the sampling frequency associated with the outgoing channels. The control unit is furthermore provided with a logic circuit producing a timing change between the consecutive writing and reading intervals when the time interval varying between writing and reading becomes shorter than a given minimum duration, overlapping of these intervals is prevented.

In order that the invention may be readily carried into effect, an embodiment thereof will now be described in detail by way of example with reference to the accompanying diagrammatic drawings in which.

Figure 1:
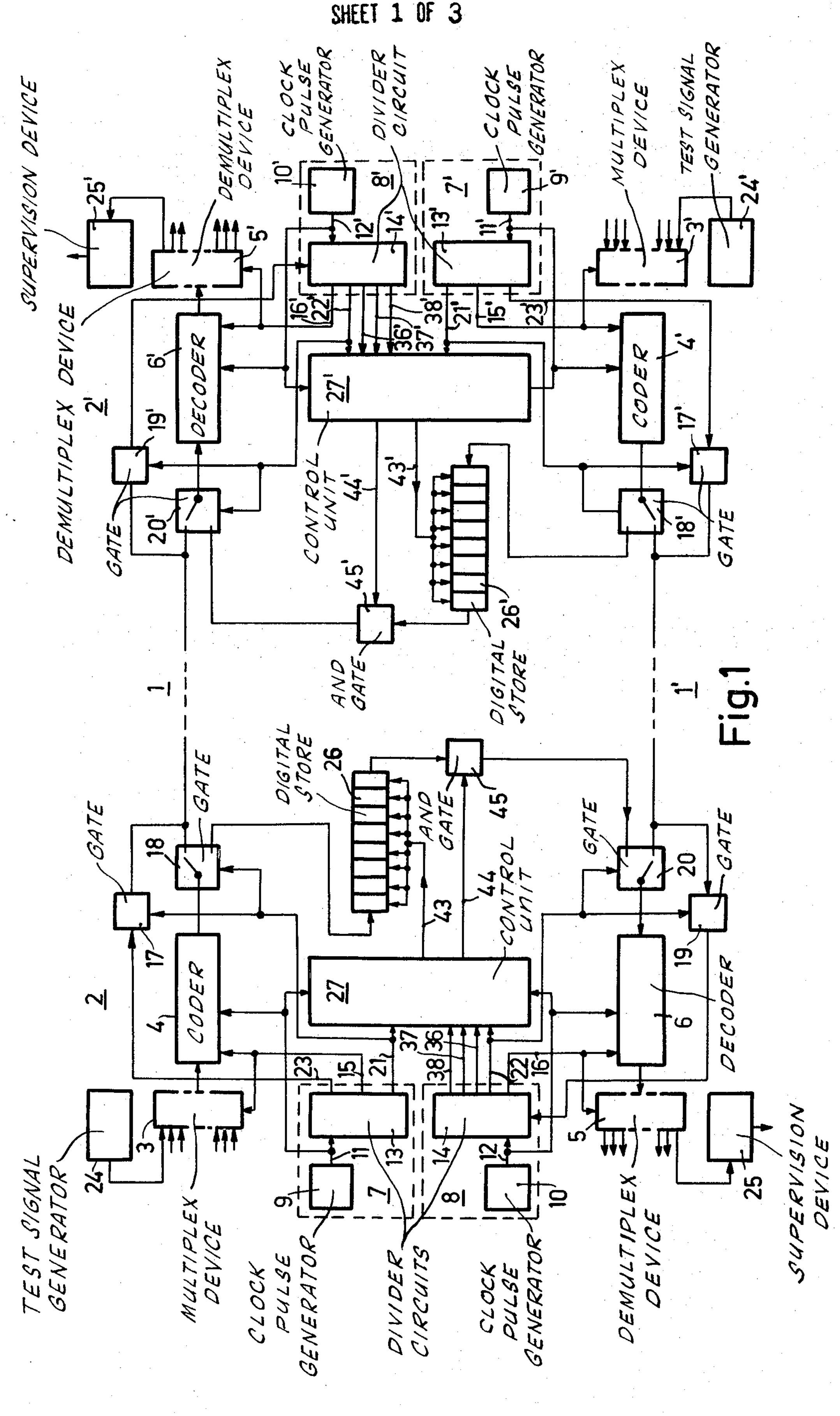
FIG. 1 shows a communication system according to the invention.

The time division multiplex communication system shown in FIG. 1 includes two terminal stations 2 and 2' connected together through separate transmission paths 1,1', and which are identically constituted for transmitting information by pulse code modulation. The corresponding parts of the two terminal stations have the same reference numerals in the Figure, but the reference numerals relating to terminal station 2' are provided with prime designations for the sake of clarity.

Each of the two terminal stations 2,2' is adapted for 30 speech channels, 1 synchronizing channel, and 1 signalling channel. Each station comprises a coder 4,4' for the information to be transmitted, coupled to the incoming channels through a multiplex device 3,3', and a decoder 6,6' coupled to the outgoing channels through a demultiplex device 5,5' for the received information signals. Also provided are separate time control devices 7,7' and 8,8', respectively, for the cyclic control of the multiplex device 3,3' and the coder 4,4', on the one hand, and the demultiplex device 5,5' and decoder 6,6', on the other hand. Said cyclic control is such, that the sampling frequency for each channel is equal to 8 kHz. Each amplitude sample of a speech channel is coded into 8 bits in the coder 4,4'. Such a series of eight consecutive bits requires a given period Ts, which will hereinafter be referred to as a time slot. Two additional frames are required for synchronization and signalling, so that a cycle consists of 32 time slots enumerated TsO to Ts31, in which TsO serves for synchronization and Ts16 serves for signalling, which is herein ignored for the sake of simplicity. The control devices 7,7' and 8,8', which provide for this cyclic control of the time division multiplex devices and coders and the demultiplex devices and decoders, respectively, each include clock pulse generators 9, 9' and 10,10'. It is to be noted, that the clock pulse generator 10' is synchronized with the clock pulse generator 9, and the clock pulse generator 10 is synchronised with the clock pulse generator 9'. The output pulses from clock pulse generators 9,9' and 10,10' are applied at one end through leads 11,11' and 12,12' to the coders 4,4' and the decoders 6,6', and at the other end they are converted into the required timing pulses with the aid of divider circuits 13,13' and 14,14'. These timing pulses correspond to the time slots TsO to Ts31, and are applied through leads 15,15' and 16,16' to the multiplex devices and coders, and to the demultiplex devices and decoders, respectively. The clock signals $K_{zz}$ and $K_{oz}$ (*zz*= transmitter end, *oz*= receiver end) have a repetition frequency of 2.048 MHz. The time slot pulses $T_s$ have a duration of 3.9 μs corresponding to the one thirty-second part of the duration of one cycle (=125 μs). Hence, 8 clock pulses occur during one time slot. During the time slots Ts0, the time control devices 7 and 7' each individually supply a synchronizing signal for the purpose of synchronizing time control devices 8' and 8 with the time control devices 7 and 7', respectively. The system is furthermore provided with four pairs of gates 17,18; 17',18'; 19,20 and 19',20', which are pairwise controlled by the time slot pulses Ts0 applied to these pairs of gates through the leads 21, 21', 22 and 22' and are generated in the time control devices 7,7', 8 and 8'. During a time slot pulse Ts0, the connection of the coders and the decoders 4,6' and 4',6 with the transmission paths 1 and 1', respectively, is interrupted by the gates 18,20' and and 18', 20 on the one hand, and on the other hand, the gates 17, 17', 19 and 19' are opened so that the synchronizing signals supplied by the time control devices 7,7', and applied through the leads 23,23' to the gates 17,17', are transmitted through the transmission paths 1 and 1' to the receiver end of the terminal stations 2' and 2. These signals are applied through gates 19' and 19 to the control devices 8' and 8, respectively, for the purpose of synchronization.

According to the invention, a very favorable and advantageous supervision of the coders and decoders used in the system is obtained, if at least one of the incoming channels of such a terminal station 2, 2' is connected to a test signal generator 24,24', and at least one of the outgoing channels of the same terminal station is connected to a supervision device 25,25'. While in this station, the outputs of the coder 4, 4' is also coupled to the input of the decoder 6,6' through a digital store 26,26' controlled by a control unit 27, 27'. The encoded amplitude sample of the analog test signal is written in the store at a frequency which is a submultiple of the sampling frequency of the test signal. The stored values are applied to the decoders 6, 6' by reading them from the store at a frequency which is substantially equal to said submultiple, in synchronism with the sampling frequency associated with the outgoing channels. The control unit 27,27' is furthermore provided with a logic circuit producing a timing change between the consecutive writing and reading intervals, when the time interval varying between writing and reading becomes shorter than a given minimum duration, whereby overlapping of these intervals is prevented.

When using the steps according to the invention the test signal need not be transmitted through the transmission paths 1,1', and therefore, testing may be effected in each cycle during time slots in which the coder and decoder are not used for the transmission of information. Such time slots are those used for synchronization and signalling. In the embodiment shown, the time slots Ts0 intended for synchronization are also used for testing. This provides the advantage that an information channel need not be sacrificed to the supervision facility. If, for the sake of simplicity, only terminal station 2 is considered, it may be noted with regard to the time control devices 7 and 8 associated with the transmitter and receiver ends, respectively, of this terminal station, that there is no fixed time relation between the time slot pulses $Tso_{zz}$, (shown in FIG. 2*a* and being generated in the time control device 7) and the time slot pulses $Tso_{oz}$ (shown in FIG. 2*c* and being generated in the time control device 8). This is because these time control devices 7 and 8 are not mutually synchronized.

In the embodiment shown, an amplitude sample of the test signal in the coder 4 is coded to 8 bits during the frame $Tso_{zz}$, and is applied in an encoded form to the store 26 through the gate 18 formed as a switching gate. The store in this embodiment is an 8-bit shift register so that an amplitude sample of the test signal coded in 8 bits can be stored therein.

Figure 2:
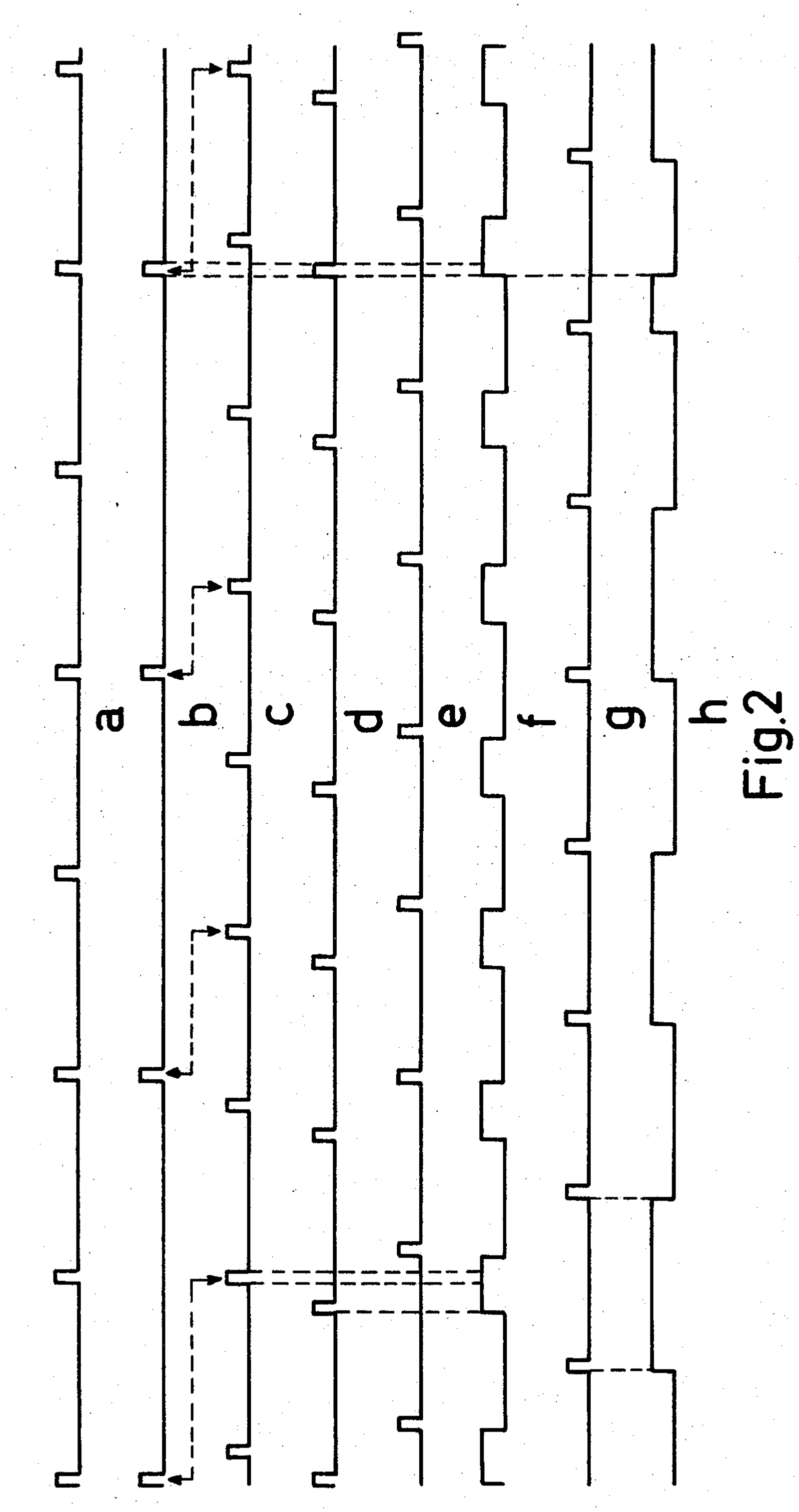
FIG. 2 shows a plurality of time diagrams to explain the operation of the system of FIG. 1 and, FIG. 3 shows a possible embodiment of the control unit used in the system of FIG. 1.
Figure 3:
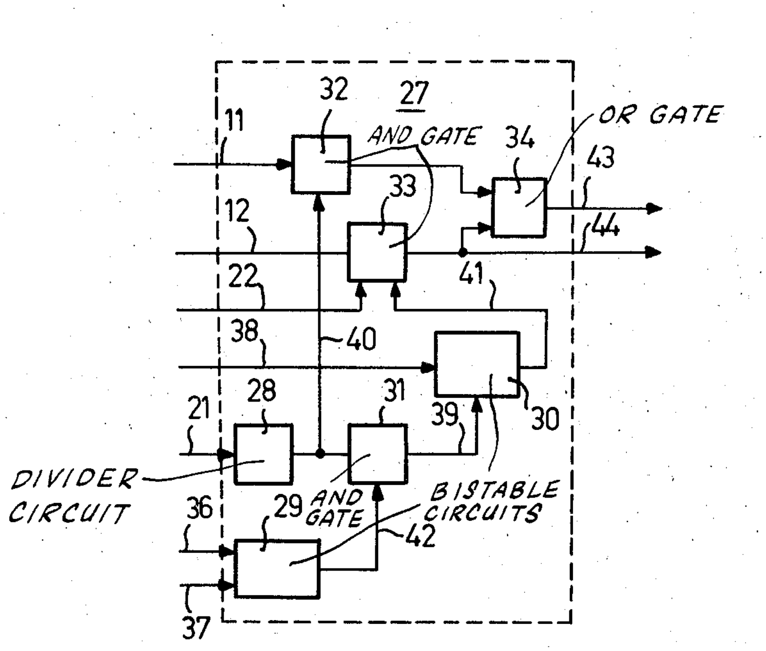

Writing in and reading from said store, is effected under the control of the associated control unit 27 during time slots $Tso_{zz}$ and $Tso_{oz}$, but at a repetition frequency which is a submultiple of the sampling frequency (8 kHz) with which these time slots are supplied by the time control devices 7 and 8. As is shown in greater detail in FIG. 3, this control unit in the embodiment shown, includes a divider circuit 28, two bistable circuits 29,30 and a plurality of logical elements constituted by the AND-gates 31, 32, 33 and the OR-gate 34. The divider circuit 28 consists of a 2-to-1 divider, in which the time slot pulses $Tso_{zz}$ generated by the time control device 7, and applied to this divider via lead 21, are divided so that a $Tso_{zz}$ time slot pulse occurs at the output only once per two consecutive cycles (cycle = 125 μs). These time slot pulses are illustrated in FIG. 2*b*. Bistable circuit 29 has a set input, and a reset input, to which the time slot pulses $Ts29_{oz}$ and $Ts5_{oz}$, generated in the time control device 8 and shown in FIGS. 2*d* and 2*e*, respectively, are applied through leads 36 and 37, respectively, to produce the periodically occurring broad pulses shown in FIG. 2*f*. These broad pulses, which will hereinafter be referred to as "protection pulses", have a duration of 8 times the slots, and extend from $Ts29_{oz}$ in one cycle to $Ts5_{oz}$ in the next cycle, so that these protection pulses are related to the time slots $Tso_{oz}$, which coincide every time approximately with the middle of such a protection pulse. Bistable circuit 30 has a first input to which the time slot pulses $Ts16_{oz}$, generated in the time control device 8 and shown in FIG. 2*g*, are applied through the lead 38. This bistable circuit is set or reset by these $Ts16_{oz}$ pulses dependent upon its instantaneous stable state. In addition, bistable circuit 30 has a second input which is connected through lead 39 to the output of AND gate 31. The time slot pulses $Ts0_{zz}$ shown in FIG. 2*b* and occurring at the output of divider circuit 28, and the protection pulses shown in FIG. 2*f* and occurring at the output of bistable circuit 29, are applied to this AND gate to produce an output pulse whenever these applied pulses overlap one another. and This output pulse is applied as a reset pulse to the bistable circuit 30 through lead 39. This bistable circuit, therefore supplies the output signal shown in FIG. 2*h*, which is hereinafter referred to as the "permit" signal, and which consists of the periodical presence or absence of pulses having a duration of 32 time slots extending from $Ts16_{oz}$ in one cycle to $Ts16_{oz}$ in the next cycle. The phase of said "permit" signal is changed when the AND gate 31 supplies a reset pulse. Gate 32 has two inputs, one of which is connected through lead 11 to the clock pulse generator 9 which supplies the clock pulses $K_{zz}$, and the other input of which, is connected through lead 40 to the output of the divider circuit 28 which supplies the time slot pulses $Tso_{zz}$ shown in FIG. 2*b*.

Gate 33 has three inputs, the first of which is connected through lead 12 to the clock pulse generator 10, which supplies the clock pulses $K_{oz}$. The second input of gate 33 is connected through lead 22 to the output of time control device 8 furnishing the time slot pulses $Tso_{oz}$. The third input is connected through lead 41 to the output of the bistable circuit 30 which supplies the output signal shown in FIG. 2h. The output of each AND gate 32, 33 is connected to the common OR gate 34, whose output is connected through lead 43 to the control input of shift register 26. The output of AND gate 33 is also connected through lead 44 to an AND gate 45 (in FIG. 1) through which the output of the shift register is connected to the gate 20 formed as a switching gate.

The operation of the control unit described is as follows: during each cycle an amplitude sample coded to 8 bits of the test signal, is applied by coder 4 to shift register 26 during the time slot $Tso_{zz}$. The divider circuit 28 provides a $Tso_{zz}$ time slot pulse (FIG. 2*b*) once per two consecutive transmission cycles. This time slot pulse is applied through lead 40 to AND gate 32 so as to enable this AND gate to pass 8 clock pulses $K_{zz}$ through OR gate 34 and lead 43 to the control input of shift register 26, so that an encoded sample of the test signal is stored in said shift register 26 once per two consecutive cycles. Accordingly, the writing interval occurs at a frequency which is equal to half the sampling frequency.

Reading from shift register 26 is effected on condition, that due to the simultaneous occurrence of a $Tso_{oz}$ time slot pulse (FIG. 2*c*) on lead 22, and a "permit" signal pulse (FIG. 2*h*) on lead 41, AND gate 33 is enabled to pass 8 clock pulses $K_{oz}$ through OR gate 34 and lead 43 to the control input of said shift register. The associated time slots $Tso_{zz}$ and $Tso_{oz}$, during which writing and reading respectively are effected, are denoted in FIGS. 2*b* and 2*c* by arrow heads connected together by broken lines. In this respect, it is to be noted that reading, like writing, is effected at a frequency which is equal to half the sampling frequency. In addition, FIGS. 2*b* and 2*c* clearly show that the time interval between writing and reading varies due to the time control devices 7 and 8 not being mutually synchronized, i.e. the interval becomes gradually longer or, as shown in the given case, it becomes gradually shorter. Overlapping of the writing and reading time slots $Tso_{zz}$ and $Tso_{oz}$ is, however, prevented by the control unit (FIG. 3), since due to the fact that the writing time slot pulse $Tso_{zz}$ (FIG. 2b) coincides approximately with the middle of the broad protection pulse (FIG. 2*f*), the reading time slot pulse $Tso_{oz}$ (FIG. 2*c*) will coincide with the broad protection pulse prior to arriving at a position overlapping the writing time slot pulse $Tso_{zz}$. This prior coincidence is used to cause a tuning change, in that the moment the reading time slot pulse $Tso_{oz}$ and the broad protection pulse overlap, AND gate 31 is enabled, and bistable circuit 30 is reset, to no longer provide a "permit" signal pulse until the bistable circuit 30 is again set by the next $Ts16_{oz}$ time slot pulse. As a result of this timing change, reading is not effected until the next time slot pulse $Tso_{oz}$ occurring after the bistable circuit 30 again provides a "permit" signal pulse. When using the steps according to the invention, a separate channel for testing is economized, and it is also achieved that the writing and reading intervals cannot overlap. Moreover, the occurrence of a false alarm as a result of malfunctioning of the transmission path is prevented. In addition, an important advantage is obtained in that the localization of the error is limited to the terminal station where the alarm occurs.

In the embodiment shown in FIG. 1, test signal generators 24,24' are adapted to supply a composite test signal, and the supervision devices 25,25' are adapted to detect conversion inaccuracies by splitting up the distortion products present in the received signals and comparing them with a reference level. The use of such a test signal generator and supervision device has the advantage that the total signal range of the converter circuit constituted by the coder and the decoder to be checked is effectively tested and supervised as is described in greater detail in patent application Ser. No. 199,229, now U.S. Pat. No. 3,745,561, issued July 10, 1973.

Finally, it may be noted that the invention is not limited to the embodiment described. The control unit associated with the store can be easily formed in such a manner, that when the writing and reading time slots follow each other at too short a distance, a tuning change is made which displaces the writing interval instead of the reading interval. In addition, writing and reading which in the embodiment shown is effected once per two consecutive cycles, may alternatively be effected once per three or more consecutive cycles.

It is even possible to write and read once per cycle, provided that the test signal is sampled at twice the frequency at which the information signal is sampled. This can be realized in a simple manner by taking a sample of the test signal not only in the synchronization time slot Tso occurring during each cycle, but also in the signalling time slot Ts16 occurring during the same cycle. The test signal generator and the supervision device, must then be connected to two incoming and outgoing channels instead of to one.

It is essential that the frequency with which writing and reading is effected is a submultiple of the sampling frequency of the test signal, because this makes it possible to displace the writing and reading intervals.

What is claimed is:

1. A time division multiplex communication system including two terminal stations connected together through two transmission paths, said stations being substantially identically constituted for transmitting information by pulse code modulation, said stations each having an encoder for information received on incoming channels to be transmitted to the other station, said encoder being coupled to the incoming channels through a time division multiplex device for sequentially providing samples to the encoder representative of the information on the different incoming channels, and a decoder for information received from the other station and to be sent on outgoing channels, said decoder being coupled to the outgoing channels through a time division multiplex device for sequentially providing signals to the respective outgoing channels representative of the decoded information samples received from the other station, said multiplex and demultiplex devices each operative at their own clock frequency, said clock frequency representing a sampling frequency for the incoming and outgoing channels, respectively, said time division multiplex communication system further comprising:

A. a signal generator for each station adapted to be connected to at least one of the incoming channels of that respective station;

B. supervision means for each station for comparing a received test signal with a reference, for connection to at least one of the outgoing channels of that respective station;

C. a digital store for each station, each digital store coupled to the output of said encoder, and the input of said decoder for that respective station; and D. a control unit means for each station for controlling its respective digital store, means associated with each control unit for sensing the respective sampling frequency for said multiplexed incoming channels, means for sensing the sampling frequency for said multiplexed outgoing channels, said control means containing means for writing a sampled signal from said signal generator into its respective store at a frequency which is a submultiple of said sampling frequency of the incoming channels and means for reading the stored signal from said store and applying it to said decoder at a frequency which is substantially equal to said submultiple frequency and in synchronism with the sampling frequency assoicated with the outgoing channels, said control unit further comprising a logic circuit means for delaying readout of said digital store an integral number of frame intervals when a time interval between consecutive writing and reading intervals becomes less than a given minimum duration, whereby overlapping of these intervals is prevented.

2. A system as claimed in claim 1 in which respective clock pulse generators associated with the time division multiplex device and the time division demultiplex device each form part of their own time control device, which respective time control devices supply time slot pulses each subdividing consecutive time division multiplex cycles and time division demultiplex cycles into a plurality of each time slots, one of which is reserved for synchronization, wherein said store is constituted by a shift register, and wherein an amplitude sample of the test signal converted into encoded form is applied to said shift register during each synchronization time slot of the consecutive time division multiplex cycles.

3. A system as claimed in claim 2, wherein the control unit comprises a first bistable circuit which in dependence upon its instantaneous stable state is set or reset by time slot pulses occurring in a middle of consecutive time division demultiplex cycles to produce a "permit" signal consisting of pulses which are periodically present and absent and whose duration is equal to the duration of a time division demultiplex cycle, said pulses extending from a middle of one cycle to a middle of a next cycle.

4. A system as claimed in claim 2, wherein the control unit associated with said shift register further comprises a two-to-one divider to which the synchronization time slot pulses occurring during consecutive time division multiplex cycles are applied, first and second AND gates connected through a common OR gate to a control input of the shift register, said first AND gate being enabled once per two consecutive time division multiplex cycles by output pulses of said two-to-one divider to pass a number of clock pulses required for writing an applied coded value from the clock pulse generator associated with the time division multiplex device, to the control input of said shift register, said second AND gate being enabled once per two consecutive time division demultiplex cycles during a synchronization time slot, and provided that a "permit" signal is present, is able to pass the number of clock pulses required for reading a stored coded value from said shift register, said clock pulses being derived from the clock pulse generator associated with the time division demultiplex device.

5. A system as claimed in claim 4, wherein said control unit furthermore comprises a second bistable circuit to which given frame pulses occurring in consecutive time division demultiplex cycles are applied and on the basis of which, said second bistable circuit producing a signal consisting of periodically occurring broad protection pulses whose duration comprises a plurality of time slots, said protection pulses being related to each of the synchronization time slot pulses of the time division demultiplex cycles in a manner, such that each of these synchronization time slot pulses coincide with approximately the middle of a respective protection pulse, and a third AND gate to which said protection pulses and the output pulses provided by said 2-to-1 divider are applied, its output being connected to a reset input of said first bistable circuit, a phase change being introduced into the "permit" signal provided by said first bistable circuit, when the pulses applied to the third AND gate overlap one another.

* * * * *

PO-1050
(5/69)

UNITED STATES PATENT OFFICE
CERTIFICATE OF CORRECTION

Patent No. 3,787,628 Dated January 22, 1974

Inventor(s) Leonardus Petrus Jozef Van Dijk etal

It is certified that error appears in the above-identified patent and that said Letters Patent are hereby corrected as shown below:

Column 2, line 3, insert a period (.) after "intervals".

Column 2, line 4, "when" should be --When--

Signed and sealed this 9th day of April 1974.

(SEAL)
Attest:

EDWARD M.FLETCHER,JR.
Attesting Officer

C. MARSHALL DANN
Commissioner of Patents

PO-1050
(5/69)

UNITED STATES PATENT OFFICE
CERTIFICATE OF CORRECTION

Patent No. 3,787,628 Dated January 22, 1974

Inventor(s) Leonardus Petrus Jozef Van Dijk, Jan Verhagen, et al
Georg Flutsch and Geerlof Jan Korevaar It is certified that error appears in the above-identified patent and that said Letters Patent are hereby corrected as shown below:

On the Title Page,

"Feutsch" should be --Flutsch--

Signed and sealed this 13th day of August 1974.

(SEAL)
Attest:

McCOY M. GIBSON, JR.
Attesting Officer

C. MARSHALL DANN
Commissioner of Patents